US011487011B1

(12) United States Patent
Chriqui et al.

(10) Patent No.: US 11,487,011 B1
(45) Date of Patent: Nov. 1, 2022

(54) N-ARM INTERFEROMETRIC PHOTONIC INTEGRATED CIRCUIT BASED SOFTWARE DEFINED OPTICAL APERTURE SYSTEM

(71) Applicant: LOCKHEED MARTIN CORPORATION, Bethesda, MD (US)

(72) Inventors: Guy Chriqui, San Mateo, CA (US); Anthony Cecere Klee, Lafayette, CO (US); Jacob Harris Wirth, Sunnyvale, CA (US); Micah Scott Boyd, Niwot, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 17/496,491

(22) Filed: Oct. 7, 2021

Related U.S. Application Data

(60) Provisional application No. 63/088,942, filed on Oct. 7, 2020.

(51) Int. Cl.
| | | |
|---|---|---|
| *G01S 17/87* | (2020.01) | |
| *G02B 6/12* | (2006.01) | |
| *G02B 27/00* | (2006.01) | |
| *G02F 1/295* | (2006.01) | |
| *G02B 6/124* | (2006.01) | |

(52) U.S. Cl.
CPC .......... *G01S 17/87* (2013.01); *G02B 6/12014* (2013.01); *G02B 27/0087* (2013.01); *G02F 1/2955* (2013.01); *G02B 6/124* (2013.01); *G02B 2006/1215* (2013.01); *G02B 2006/12107* (2013.01); *G02B 2006/12145* (2013.01); *G02B 2006/12159* (2013.01)

(58) Field of Classification Search
None
See application file for complete search history.

(56) References Cited

U.S. PATENT DOCUMENTS

| | | | |
|---|---|---|---|
| 10,274,599 B2* | 4/2019 | Schmalenberg | G01S 7/4817 |
| 10,705,407 B2* | 7/2020 | Hosseini | G02B 27/48 |
| 10,989,523 B2* | 4/2021 | Georgeson | G01B 11/165 |
| 11,353,769 B2* | 6/2022 | Hosseini | G01S 17/42 |
| 2017/0350965 A1* | 12/2017 | Schmalenberg | G01S 7/4817 |
| 2018/0348592 A1* | 12/2018 | Hosseini | G02B 27/0087 |

* cited by examiner

*Primary Examiner* — Jerry Rahll
(74) *Attorney, Agent, or Firm* — BakerHostetler (57) ABSTRACT

An optical aperture system is provided that includes a photonic integrated circuit. The photonic integrated circuit includes a plurality of apertures, a plurality of optical phase shifters coupled to respective apertures of the plurality of apertures, an optical splitter-combiner coupled to the plurality of optical phase shifters, an optical switch coupled to the optical splitter-combiner, a light source coupled to the optical switch, and a photodetector coupled to the optical switch. The optical aperture system further includes a controller configured to execute a first set of instructions to control the plurality of optical phase shifters and the light source in accordance with a first operating mode of a plurality of operating modes of the optical aperture system, and a processor configured to execute a second set of instructions to process an output of the photodetector in accordance with the first operating mode of the optical aperture system.

20 Claims, 5 Drawing Sheets

N-ARM INTERFEROMETRIC PHOTONIC INTEGRATED CIRCUIT BASED SOFTWARE DEFINED OPTICAL APERTURE SYSTEM

This application claims the benefit of U.S. Provisional Application No. 63/088,942 titled N-ARM INTERFEROMETRIC PHOTONIC INTEGRATED CIRCUIT BASED SOFTWARE DEFINED OPTICAL APERTURE SYSTEM and filed on Oct. 7, 2020, which is hereby incorporated by reference herein.

STATEMENT REGARDING FEDERALLY SPONSORED RESEARCH OR DEVELOPMENT

Not applicable

FIELD OF THE INVENTION

The present disclosure generally relates to satellite payload system including, for example, solid-state optical payload systems.

BACKGROUND

The industry is trending toward large constellations of small satellites, where size, weight and power (SWaP) are at a premium. Typically, space-based payloads are predominantly single-function systems, resulting in the emergence of module categories (e.g., imager, communications, processor, flight control, etc.). Low SWaP designs for any one module category are typically achieved through increased computational dependence. The resulting segregated module category systems lead to higher SWaP and higher manufacturing/operational costs.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed, in part, to providing a scalable multi-use optical system capable of multiple operating modes. The operating modes may include, but are not limited to, laser communications modes, imaging modes, laser ranging modes, digital holography modes, vortex beam generation modes, synthetic aperture lidar modes, spectral imaging modes, and wavefront sensing modes. The disclosed scalable multi-use optical system utilizes a single photonic integrated circuit (PIC) together with a processor and controller configured to execute instructions to control components of the PIC to operate in an operating mode selected from a group of operating modes, such as those listed above. Loading a new set of instructions allows the system to change its operating mode while still using the same PIC.

The disclosed PIC based architecture interferes all input waveguides simultaneously rather than in a typical pair-wise structure. Optical path difference (OPD) control using optical phase shifters provides for fringe scanning for interferometric imaging and constructive beam combination for boosting or non-mechanical steering of transmitted or received optical communication signals. The disclosed architecture departs from 2-arm interferometry and may use N-arm interferometry and an array waveguide grating (AWG) along with a non-redundant lenslet configuration and signal processing algorithms. Thus, the subject technology spans the segregated computational imaging, heterodyne imaging, laser communications, laser ranging, laser radar, digital holography, custom vortex beam generation and jam resistant IR tracking module categories while exploiting reduced size, weight and power (SWaP) benefits of PIC based systems to provide a low cost SWaP (C-SWaP) payload.

The subject technology has significant advantages over the typical single-function segregated module category architecture. For example, the subject technology provides numerous quantitative performance improvements to all functional capabilities, as well as lithographic manufacturing and scalability benefits. N-arm interferometry techniques yield [N−1] times the number of spatial frequency samples compared to a 2-arm interferometry architecture for a design with non-redundant lenslet arrays. This amounts to improvements in image quality by a factor of about 2.5. Denser sampling of the spatial frequency domain affords three equally important benefits to imaging. First, it permits greater flexibility when selecting the system's Field-of-View (FOV). Second, it mitigates the need for compressed sensing and computationally intensive reconstruction tasks. Third, it approaches diffraction-limited imaging comparable to lensed optical systems.

The N-arm interferometric PIC design of the subject technology is vastly simplified in comparison to precedent 2-arm interferometric PIC designs. Fewer waveguide paths are needed as all route to a single multi-mode interferometer. Thus, the quantity and complexity of lithographic features are limited. In turn, manufacturing costs for the full payload assembly may be reduced.

Figure 1:
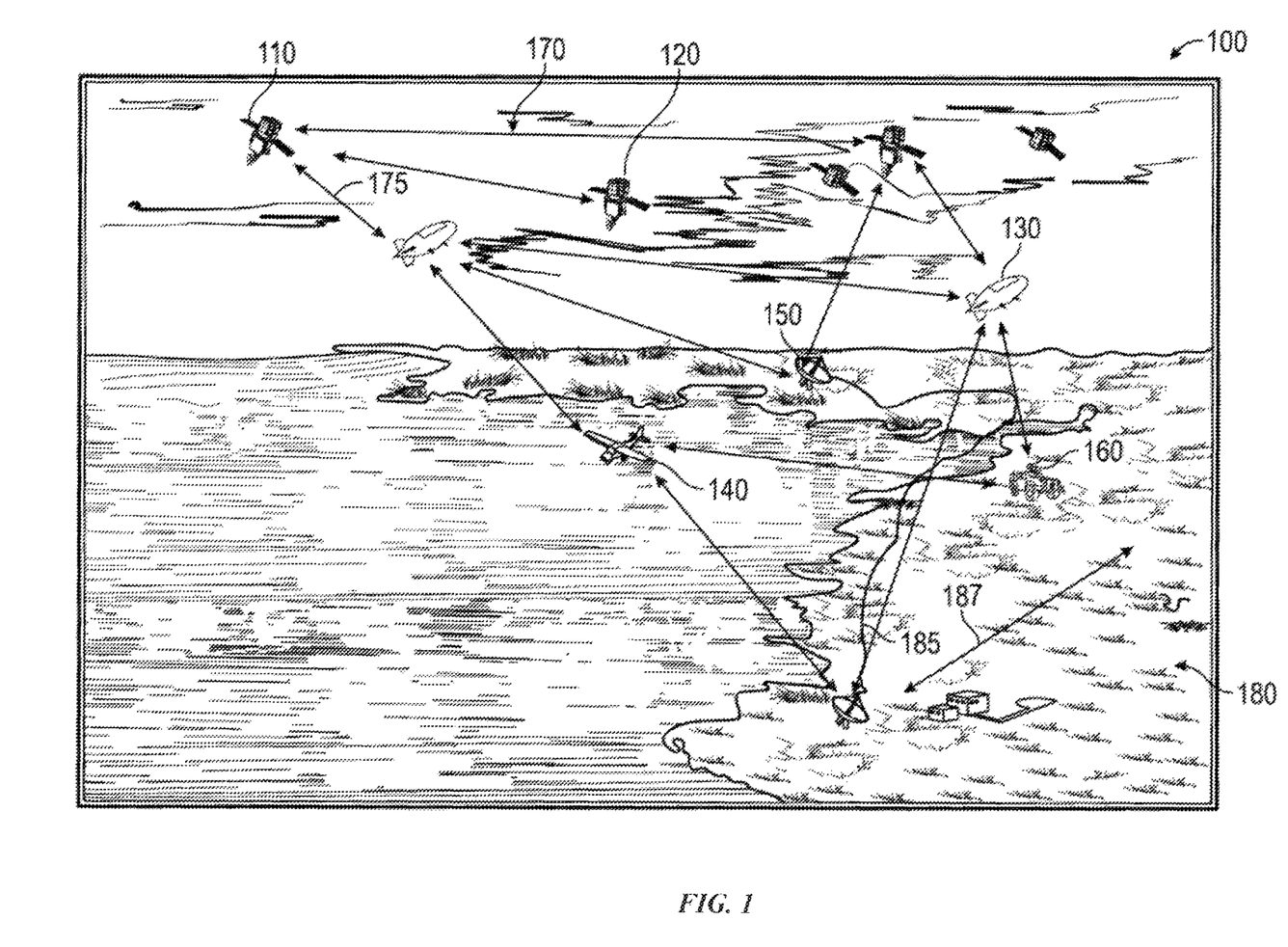
FIG. 1 is a schematic diagram illustrating an example satellite communication system according to aspects of the subject technology.

FIG. 1 is a schematic diagram of an example satellite communication system 100 having geosynchronous orbit communications satellites (e.g., GEO SatCom) 110, low-earth orbit (LEO) satellites 120, high altitude airships 130, aircraft 140, fixed ground stations 150 and mobile ground stations 160. The satellite communication system 100 includes a free space optical communication (FSOC) network 170 having multiple FSOC links 175, as well as a ground based network 180 having both fiber links 185 and fixed point wireless links 187.

The FSOC architecture provides many benefits. For example, the FSOC links 175 are fade-resistant communication links and non-mechanical jitter compensation is provided for FSOC links 175 that are space links. The FSOC architecture also provides integration with reduced SWaP slow beam steering for large angle pointing and provide for large antenna gains that result in lower power requirements. The FSOC architecture allows for conformal integration with air and space vehicles (e.g., GEO SatComs 110, LEO satellites 120, high altitude airships 130, aircraft 140). As shown in FIG. 1, with the addition of the FSOC links 175 on the ground (e.g., fixed point wireless links 187), the FSOC architecture is deployable in ground, air and space systems.

Figure 2:
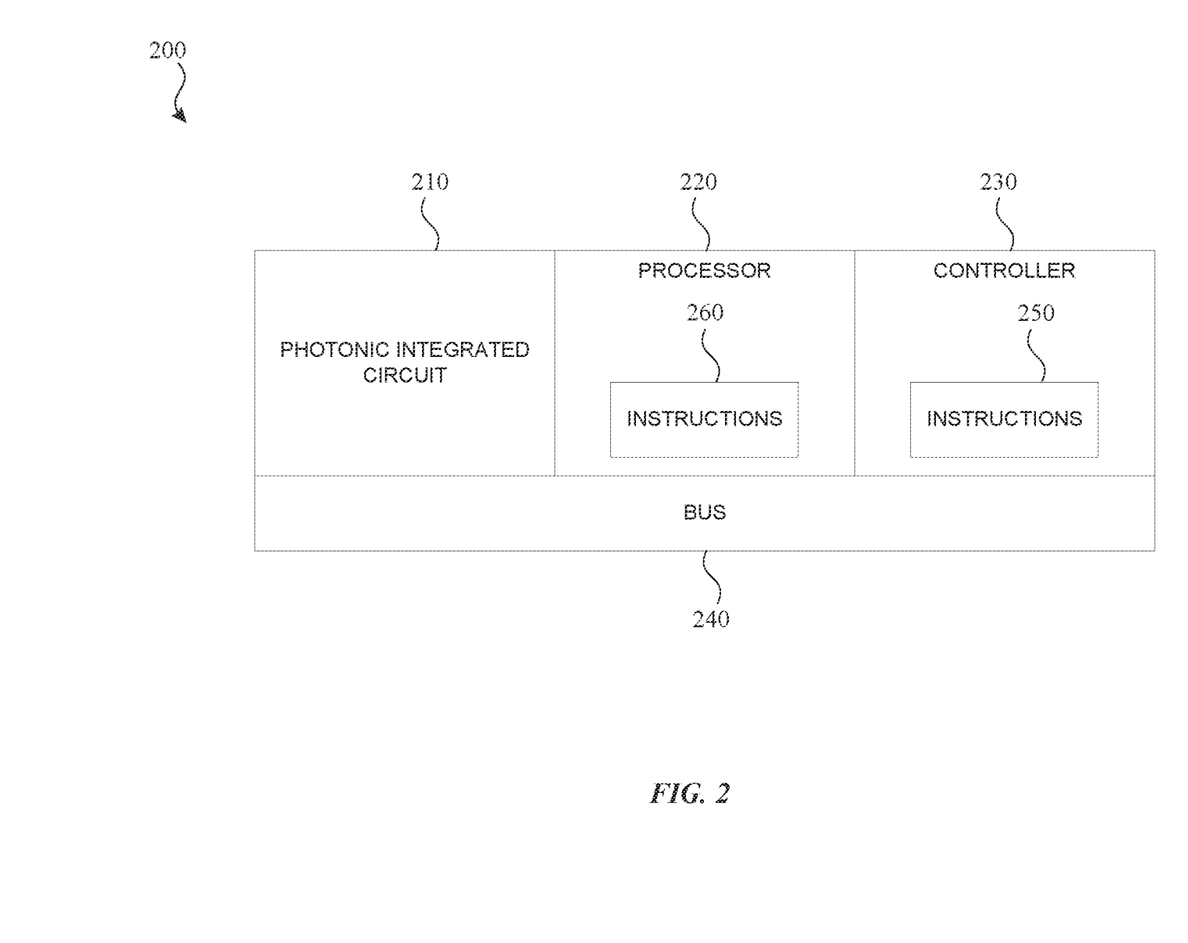
FIG. 2 is a block diagram illustrating components of a payload system according to aspects of the subject technology.

FIG. 2 is a block diagram illustrating an example of an optical aperture system or payload system according to aspects of the subject technology. The payload system may be configured for use in a space-based vehicle, a terrestrial-based vehicle, and/or a fixed structural installation. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As depicted in FIG. 2, payload system 200 includes photonic integrated circuit 210, processor 220, controller 230, and bus 240. Briefly, controller 230 is configured to execute instructions 250 loaded into a memory of controller 230 to control optical components of photonic integrated circuit 210 in accordance with an operating mode of payload system 200. Similarly, processor 220 is configured to execute instructions 260 loaded into a memory of processor 220 to read out and process an output of photonic integrated circuit 210 in accordance with the operating mode of payload system 200. Control signals and data may be communicated between photonic integrated circuit 210, processor 220, and controller 230 via bus 240.

The operating modes of payload system 200 include, but are not limited to, laser communications modes, imaging modes, laser ranging modes, digital holography modes, vortex beam generation modes, synthetic aperture lidar modes, spectral imaging modes, and wavefront sensing modes. A new operating mode of payload system 210 may be selected by loading new instructions into the memories of controller 230 and processor 220, followed by controller 230 and processor 220 executing those instructions. Alternatively, the memories of controller 230 and processor 220 may contain instructions for multiple operating modes and a new operating mode may be selected by controller 230 and processor 220 selecting and executing a different set of instructions from the respective memories for the new operating mode.

Processor 220 and controller 230 or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. The memories of processor 220 and controller 230 may include suitable logic, circuitry, and/or code that enable storage of various types of information such as received data, generated data, code, and/or configuration information. Memory 220 may include, for example, random access memory (RAM), read-only memory (ROM), flash memory, and/or magnetic storage.

Figure 3:
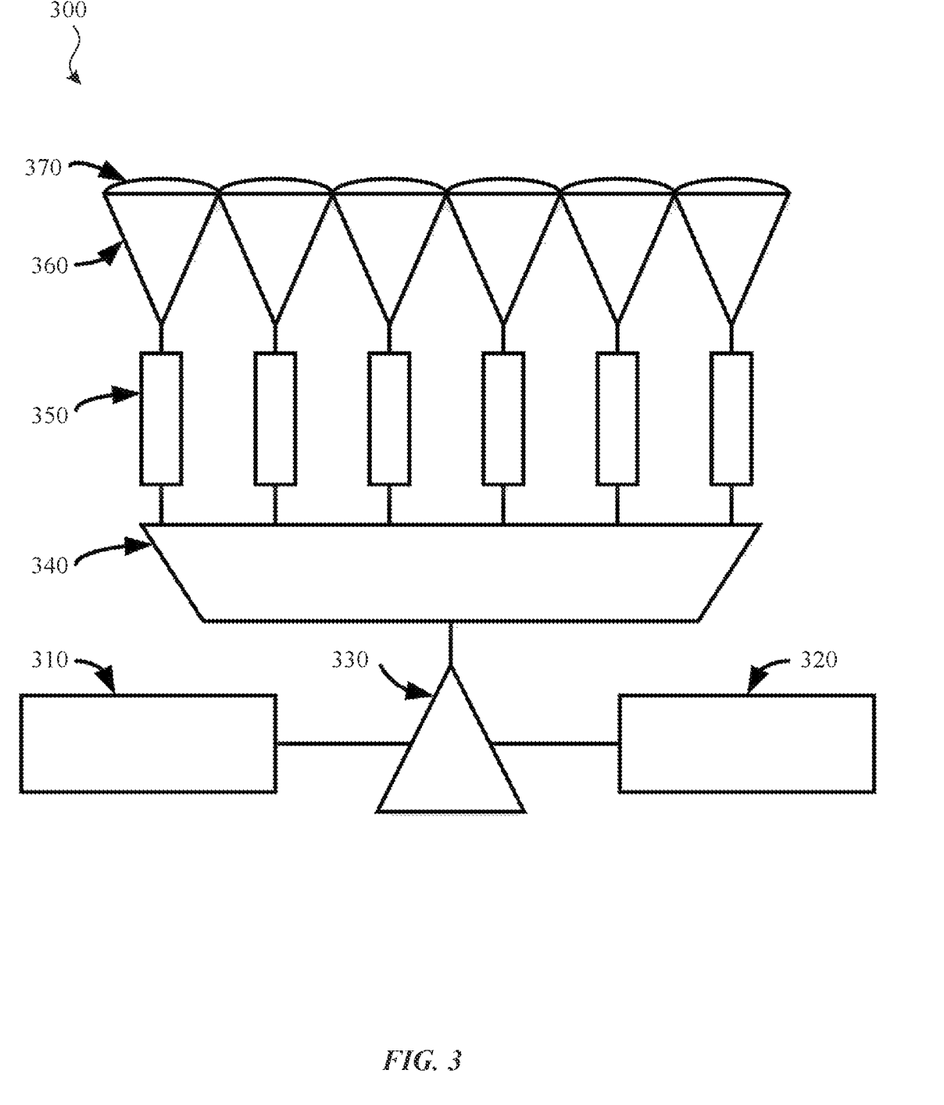
FIG. 3 is a block diagram illustrating components of a photonic integrated circuit according to aspects of the subject technology.

FIG. 3 is a block diagram illustrating components of a photonic integrated circuit according to aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As depicted in FIG. 3, photonic integrated circuit 300 includes light source 310, photodetector 320, optical switch 330, optical splitter-combiner 340, optical phase shifters 350, apertures 360, and optical coupling elements 370. Light source 310 may be a laser light source configured to provide one or more light pulses or continuous wave light depending on the operating mode of the payload system. Light source 310 may be controlled with control signals received from the controller. Photodetector 320 may be configured to receive light signals and convert the light signals into electrical signals for further processing. The processor may be configured to read out the electrical signals generated by photodetector 320 in response to a received light signal. Light source 310 and photodetector 320 may be coupled to optical switch 330. Optical switch 330 allows photonic integrated circuit to switch between emitting light generated by light source 310 and receiving light by photodetector 320. Optical switch 320 may be controlled by the controller to direct light out from light source 310 or direct light into photodetector 320. Optical switch 330 may be an optical circulator.

Optical splitter-combiner 340 may be coupled to optical switch 330 and be configured to split light received from light source 310 via optical switch 330 into multiple channels, and to combine multiple channels of light received by photonic integrated circuit 300 for reception by photodetector 320 via optical switch 330. According to aspects of the subject technology, optical splitter-combiner 340 may be a multi-mode N-arm interferometer or, more particularly, a multi-mode N×1 interferometer. While a single photodetector 320 is depicted in FIG. 3, photonic integrated circuit 300 may include multiple photodetectors with an array waveguide grating arranged between optical splitter-combiner 340 and photodetector 320 to divide the signal into the multiple photodetectors.

Optical phase shifters 350 may be coupled to optical splitter-combiner 340 and are controlled by the controller. Optical phase shifters 350 may be configured to apply different phase shifts to the respective channels of light either received by photonic integrated circuit 300 or transmitted by photonic integrated circuit 300. The subject technology is not limited to any particular type of optical phase shifter. In addition to an optical phase shifter, each channel also may include an amplifier that may be used for amplitude compensation or may be used as a shutter to turn on and off a particular channel. The amplifiers also may be controlled by the controller.

Figure 4:
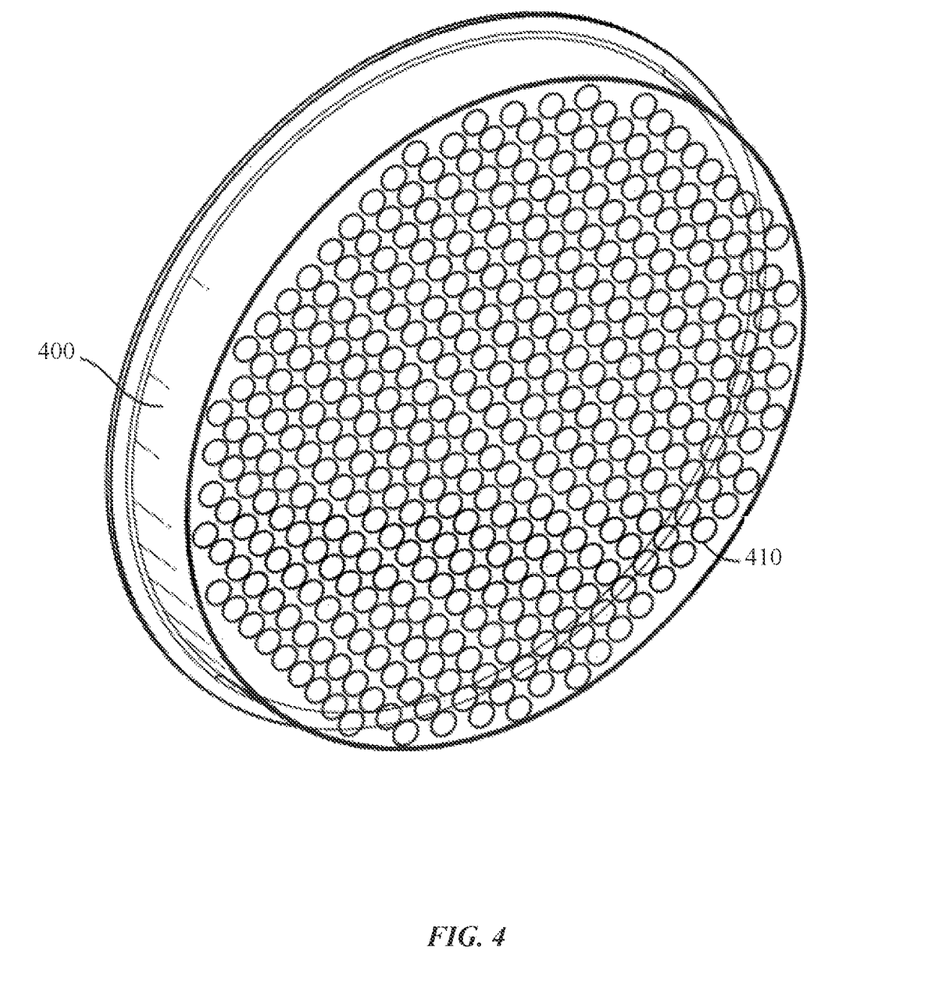
FIG. 4 is a schematic diagram illustrating a lenslet array according to aspects of the subject technology.

As depicted in FIG. 3, each optical phase shifter 350 is coupled to a respective aperture 360. Apertures 360 are the ports from which light is emitted by the photonic integrated circuit and into which light is received by the photonic integrated circuit. Each of the apertures 360 may be coupled to a respective optical coupling element 370, which provides an interface with free space for the light received and emitted by the photonic integrated circuit. Optical coupling elements 370 may be a one-dimensional array of lenslets or a two-dimensional array of lenslets such as lenslet array 400 containing a two-dimensional array of lenslets 410 depicted in FIG. 4.

Figure 5:
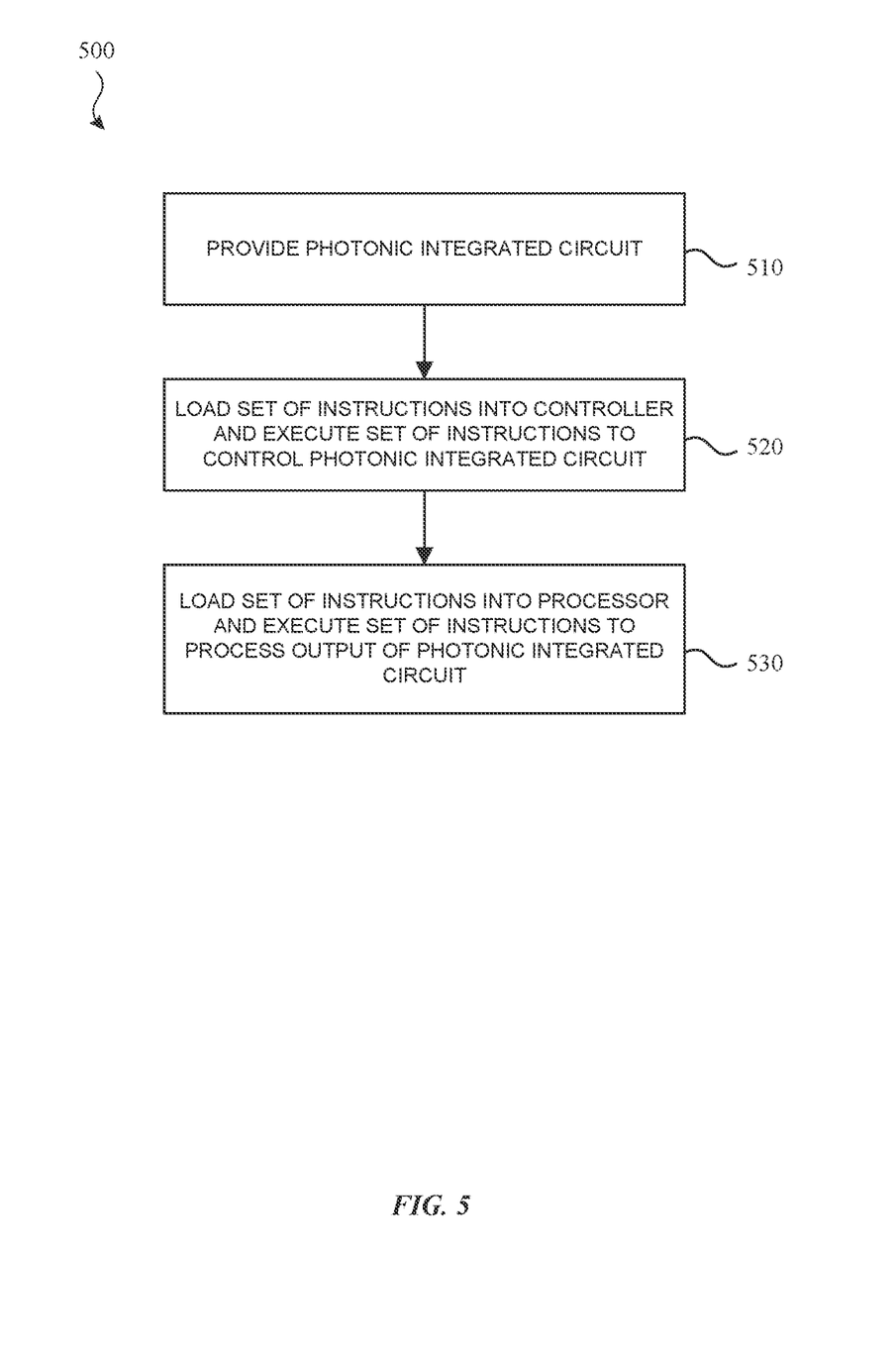
FIG. 5 is a flowchart illustrating process for operating a payload system according to aspects of the subject technology.

FIG. 5 is a flowchart illustrating a process 500 of operating a payload system according to aspects of the subject technology. For explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

Process 500 includes providing photonic integrated circuit (block 510). As depicted in FIG. 3, the photonic integrated circuit may include multiple apertures with optical phase shifters coupled to respective ones of the apertures. The optical phase shifters may be coupled to an optical splitter-combiner that is coupled to an optical switch. Also coupled to the optical switch are a light source and a photodetector.

A set of instructions may be loaded into a controller and the controller may execute the set of instructions to control components of the photonic integrated circuit (block 520). For example, the controller may control the light source and the optical phase shifters according to a selected operating mode corresponding to the set of instructions loaded into the controller. A set of instructions also may be loaded into a processor and the processor may execute the set of instructions to process an output of the photonic integrated circuit (block 530). For example, the processor may read out and process signals generated by the photodetector according to the selected operating mode corresponding to the set of instructions loaded into the processor.

As an example, the selected operating mode may be to provide LIDAR functionality using the photonic integrated circuit. The loaded sets of instructions cause the controller to control the light source to emit a short light pulse that is split by the optical splitter-combiner and nonmechanically steered by the controller controlling the optical phase shifters. The light exits the apertures and is steered towards an area of interest. Reflected light returns to the coupling elements and the view angle may be adjusted by the optical phase shifters controlled by the controller for return light correcting for point ahead. The light is then recombined by the optical splitter-combiner and received at the photodetector, from which the processor determines and records a time of flight. This process is then repeated for multiple view angles by nonmechanical beam steering and a 3D point cloud of the area of interest is reconstructed.

The payload system may be used to provide other functionality in addition to LIDAR by loading new sets of instructions into the controller and the processor. In this manner, the same hardware may be repurposed for a new operating mode. For example, if instead of LIDAR, a beam shaping mode of operation is required for a particular mission, new sets of instructions may be transmitted to the payload system and loaded into the controller and the processor. Alternatively, the new sets of instructions may be stored in memories of the controller and the processor and a selection signal may be sent to instruct the controller and the processor to load the new sets of instructions from their respective memories.

Upon executing the new set of instructions, the controller may control the light source to emit a continuous wave light which is split by the optical splitter-combiner. The controller may then control the optical phase shifters based on a predefined spatial phase function (e.g. vortex). The light then exits the apertures and diffracts into the desired beam shape.

According to aspects of the subject technology, the architecture of the payload system allows multiple modes of operation to be executed using the same set of hardware by loading different sets of instructions into the hardware. Specifically, a single photonic integrated circuit can be controlled by a controller and its output processed by a processor to provide a mode of operating selected from a variety of possible modes of operation. The operating modes may include, but are not limited to, laser communications modes, imaging modes, laser ranging modes, digital holography modes, vortex beam generation modes, synthetic aperture lidar modes, spectral imaging modes, and wavefront sensing modes. This architecture allows multiple functions to be able to be performed by the payload system without requiring a unique set of hardware for each desired function. For space-based applications, this architecture significantly reduces the payload requirements without reducing the available functionality. In addition, sets of instructions for new functionality can be transmitted to the spacecraft and loaded into the architecture after the spacecraft has launched.

According to aspects of the subject technology, an optical aperture system is provided that includes a photonic integrated circuit. The photonic integrated circuit includes a plurality of apertures, a plurality of optical phase shifters coupled to respective apertures of the plurality of apertures, an optical splitter-combiner coupled to the plurality of optical phase shifters, an optical switch coupled to the optical splitter-combiner, a light source coupled to the optical switch, and a photodetector coupled to the optical switch. The optical aperture system further includes a controller configured to execute a first set of instructions to control the plurality of optical phase shifters and the light source in accordance with a first operating mode of a plurality of operating modes of the optical aperture system, and a processor configured to execute a second set of instructions to process an output of the photodetector in accordance with the first operating mode of the optical aperture system.

The optical splitter-combiner may be a multi-mode N-arm interferometer. The multi-mode N-arm interferometer may be an N×1 interferometer. The optical switch may comprise an optical circulator. The photonic integrated circuit may further include an array waveguide grating coupled to the optical switch, and a plurality of photodetectors coupled to the array waveguide grating. The optical aperture system may further include a lenslet array comprising a plurality of lenslets coupled to respective apertures of the plurality of apertures. The lenslet array may be a non-redundant lenslet array. The optical aperture may further include a waveguide grating coupler coupled to the plurality of apertures.

The controller may be further configured to execute a third set of instructions to control the plurality of optical phase shifters and the light source in accordance with a second operating mode of a plurality of operating modes of the optical aperture system, and the processor further configured to execute a fourth set of instructions to process an output of the photodetector in accordance with the second operating mode of the optical aperture system. The first operating mode is different from the second operating mode.

The plurality of operating modes may include a laser communications mode, an imaging mode, a laser ranging mode, a digital holography mode, a vortex beam generation mode, a synthetic aperture lidar mode, a spectral imaging mode, and a wavefront sensing mode.

According to aspects of the subject technology, a method is provided that includes providing a photonic integrated circuit. The photonic integrated circuit includes a plurality of apertures, a plurality of optical phase shifters coupled to respective apertures of the plurality of apertures, an optical splitter-combiner coupled to the plurality of optical phase shifters, an optical switch coupled to the optical splitter-combiner, a light source coupled to the optical switch, and a photodetector coupled to the optical switch. The method further includes loading a first set of instructions into a controller and executing the first set of instructions, wherein the controller upon executing the first set of instructions controls the plurality of optical phase shifters and the light source in accordance with a first operating mode of a plurality of operating modes; and loading a second set of instructions into a processor and executing the second set of instructions, wherein the processor upon executing the second set of instructions processes an output of the photodetector in accordance with the first operating mode.

The method may further include loading a third set of instructions into the controller and executing the third set of instructions, wherein the controller upon executing the third set of instructions controls the plurality of optical phase shifters and the light source in accordance with a second operating mode of the plurality of operating modes; and loading a fourth set of instructions into the processor and executing the fourth set of instructions, wherein the processor upon executing the fourth set of instructions processes an output of the photodetector in accordance with the second operating mode, wherein the second operating mode is different from the first operating mode. The plurality of operating modes may include a laser communications mode, an imaging mode, a laser ranging mode, a digital holography mode, a vortex beam generation mode, a synthetic aperture lidar mode, a spectral imaging mode, and a wavefront sensing mode.

The optical splitter-combiner may be a multi-mode N-arm interferometer. The multi-mode N-arm interferometer may be an N×1 interferometer. The optical switch may comprise an optical circulator. The photonic integrated circuit may further include an array waveguide grating coupled to the optical switch, and a plurality of photodetectors coupled to the array waveguide grating. The photonic integrated circuit may further include a lenslet array comprising a plurality of lenslets coupled to respective apertures of the plurality of apertures. The lenslet array may be a non-redundant lenslet array. The photonic integrated circuit may further include a waveguide grating coupler coupled to the plurality of apertures.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. An optical aperture system comprising:
    a photonic integrated circuit comprising:
        a plurality of apertures;
        a plurality of optical phase shifters coupled to respective apertures of the plurality of apertures;
        an optical splitter-combiner coupled to the plurality of optical phase shifters;
        an optical switch coupled to the optical splitter-combiner;
        a light source coupled to the optical switch; and
        a photodetector coupled to the optical switch;
    a controller configured to execute a first set of instructions to control the plurality of optical phase shifters and the light source in accordance with a first operating mode of a plurality of operating modes of the optical aperture system; and
    a processor configured to execute a second set of instructions to process an output of the photodetector in accordance with the first operating mode of the optical aperture system.

2. The optical aperture system of claim 1, wherein the optical splitter-combiner is a multi-mode N-arm interferometer.

3. The optical aperture system of claim 2, wherein the multi-mode N-arm interferometer is an N×1 interferometer.

4. The optical aperture system of claim 1, wherein the optical switch comprises an optical circulator.

5. The optical aperture system of claim 1, wherein the photonic integrated circuit further comprises:
    an array waveguide grating coupled to the optical switch; and
    a plurality of photodetectors coupled to the array waveguide grating.

6. The optical aperture system of claim 1, further comprising a lenslet array comprising a plurality of lenslets coupled to respective apertures of the plurality of apertures.

7. The optical aperture system of claim 6, wherein the lenslet array is a non-redundant lenslet array.

8. The optical aperture system of claim 1, further comprising a waveguide grating coupler coupled to the plurality of apertures.

9. The optical aperture system of claim 1, wherein:
    the controller is further configured to execute a third set of instructions to control the plurality of optical phase shifters and the light source in accordance with a second operating mode of a plurality of operating modes of the optical aperture system; and
    the processor is further configured to execute a fourth set of instructions to process an output of the photodetector in accordance with the second operating mode of the optical aperture system,
    wherein the first operating mode is different from the second operating mode.

10. The optical aperture system of claim 1, wherein the plurality of operating modes comprises a laser communications mode, an imaging mode, a laser ranging mode, a digital holography mode, a vortex beam generation mode, a synthetic aperture lidar mode, a spectral imaging mode, and a wavefront sensing mode.

11. A method comprising:
    providing a photonic integrated circuit, wherein the photonic integrated circuit comprises:
    a plurality of apertures;
    a plurality of optical phase shifters coupled to respective apertures of the plurality of apertures;
    an optical splitter-combiner coupled to the plurality of optical phase shifters;
    an optical switch coupled to the optical splitter-combiner;
    a light source coupled to the optical switch; and
    a photodetector coupled to the optical switch;
    loading a first set of instructions into a controller and executing the first set of instructions, wherein the controller upon executing the first set of instructions controls the plurality of optical phase shifters and the light source in accordance with a first operating mode of a plurality of operating modes; and
    loading a second set of instructions into a processor and executing the second set of instructions, wherein the processor upon executing the second set of instructions processes an output of the photodetector in accordance with the first operating mode.

12. The method of claim 11, further comprising:
    loading a third set of instructions into the controller and executing the third set of instructions, wherein the controller upon executing the third set of instructions controls the plurality of optical phase shifters and the light source in accordance with a second operating mode of the plurality of operating modes; and
    loading a fourth set of instructions into the processor and executing the fourth set of instructions, wherein the processor upon executing the fourth set of instructions processes an output of the photodetector in accordance with the second operating mode,
    wherein the second operating mode is different from the first operating mode.

13. The method of claim 11, wherein the plurality of operating modes comprises a laser communications mode, an imaging mode, a laser ranging mode, a digital holography mode, a vortex beam generation mode, a synthetic aperture lidar mode, a spectral imaging mode, and a wavefront sensing mode.

14. The method of claim 11, wherein the optical splitter-combiner is a multi-mode N-arm interferometer.

15. The method of claim 14, wherein the multi-mode N-arm interferometer is an N×1 interferometer.

16. The method of claim 11, wherein the optical switch comprises an optical circulator.

17. The method of claim 11, wherein the photonic integrated circuit further comprises:
    an array waveguide grating coupled to the optical switch; and
    a plurality of photodetectors coupled to the array waveguide grating.

18. The method of claim 11, wherein the photonic integrated circuit further comprises a lenslet array comprising a plurality of lenslets coupled to respective apertures of the plurality of apertures.

19. The method of claim 18, wherein the lenslet array is a non-redundant lenslet array.

20. The method of claim 11, wherein the photonic integrated circuit further comprises a waveguide grating coupler coupled to the plurality of apertures.

* * * * *